(12) United States Patent
Guajardo et al.

(10) Patent No.: US 12,225,411 B2
(45) Date of Patent: Feb. 11, 2025

(54) SHARING OF VIRTUALIZED NETWORK RESOURCE

(71) Applicant: DISH Wireless L.L.C., Englewood, CO (US)

(72) Inventors: Marcel Guajardo, Englewood, CO (US); Owen Christens-Barry, Englewood, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 398 days.

(21) Appl. No.: 17/847,069

(22) Filed: Jun. 22, 2022

(65) Prior Publication Data

US 2023/0422099 A1  Dec. 28, 2023

(51) Int. Cl.
*H04W 28/16* (2009.01)
*H04L 41/40* (2022.01)
*H04W 16/10* (2009.01)

(52) U.S. Cl.
CPC ............. *H04W 28/16* (2013.01); *H04L 41/40* (2022.05); *H04W 16/10* (2013.01)

(58) Field of Classification Search
CPC ........ H04W 28/16; H04W 16/10; H04L 41/40
USPC .......................................................... 455/450
See application file for complete search history.

(56) References Cited

U.S. PATENT DOCUMENTS

| | | | |
|---|---|---|---|
| 2009/0077238 A1* | 3/2009 | Gao ........................ | H04L 45/50 709/226 |
| 2018/0041578 A1* | 2/2018 | Lee ......................... | H04L 47/70 |
| 2019/0268777 A1* | 8/2019 | Simon ................. | H04N 21/6131 |
| 2020/0092685 A1* | 3/2020 | Fehrenbach ........ | H04W 84/005 |
| 2021/0099335 A1* | 4/2021 | Li ........................ | H04L 41/5041 |

* cited by examiner

*Primary Examiner* — Michael R Neff
(74) *Attorney, Agent, or Firm* — Seed IP Law Group LLP (57) ABSTRACT

This disclosure relates to the sharing of communications network resources. An example method includes presenting options and statuses of sharable network resources of a communications network, obtaining a request for one or more network resources of the communications network, and determining sharing availability of the one or more network resources. The method also includes updating further presenting the options and statuses of sharable network resources based on the determined sharing availability, and causing establishment of the one or more network resources.

18 Claims, 4 Drawing Sheets

SHARING OF VIRTUALIZED NETWORK RESOURCE

BACKGROUND

The advent and implementation of Fifth Generation (5G) wireless communication technology has resulted in faster speeds and increased bandwidth, but the rigidity of network infrastructure can cause various difficulties and drawbacks. It is with respect to these and other considerations that the embodiments described herein have been made.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Wireless communications network, such as 5G cellular network, can be implemented on containerized, cloud-based, or otherwise virtualized network architecture of a mobile network operator (MNO), including various virtualized network infrastructure components. The virtualized architecture can provide services that utilize specific components of the MNO's public cellular network. In addition, the virtualized architecture can lease, delegate, share, or otherwise provide specific components to specific customer types.

For example, a light mobile virtual network operator (MVNO) that desires to use the MNO's 5G technology may not have some of the 5G network architecture functions or interfaces available, and the MNO can offer to provide these from its own virtualized network Core (e.g., Home Policy Control Function (PCF), Unified Data Management (UDM), Charging Function (CHF), or the like). As another example, a private network cell site can share radio resources to provide a) a private enterprise with a private network footprint and b) general wireless customers of the MNO with enhanced public network coverage.

Generally speaking, the MNO can share network resources to provide multiple customers or customer groups with additional benefits beyond just the MNO's 5G services that they subscribe to. For customers (e.g., enterprises) who need access to 5G network functionality or may otherwise benefit from sharing network resources, the presently disclosed technology provides a network resource sharing facilitator to provide relevant services. In some embodiments, example features of the facilitator can include:

Integration with sales lead engine and associated project management tool

Integration with pricing engine to deliver cost estimate to prospective customer Analysis of network resource availability (e.g., ability to identify necessary network components and resource availability to deliver customer solution—may involve network slicing or other means to do so)

Integration with product catalog

Ability to assign a new product catalog bundle of all network components to be used in service delivery Ability to deliver services to multiple customers using shared resources (e.g., based on customer's indicated level or extent of resource sharing)

In some embodiments, the network resource sharing facilitator is included in a system that is configured to perform actions including presenting options and statuses of sharable network resources of a communications network, obtaining a request for one or more network resources of the communications network, and determining sharing availability of the one or more network resources. The actions also include updating further presenting the options and statuses of sharable network resources based, at least in part, on the determined sharing availability, and causing establishment of the one or more network resources.

In some embodiments, the sharable network resources include at least a virtualized network infrastructure component. In some embodiments, the virtualized network infrastructure component includes at least one of a virtualized Network Exposure Function (NEF), virtualized Network Function Repository Function (NRF), virtualized User Plane Function (UPF), virtualized Access & Mobility Management Function (AMF), or virtualized Application Function (AF). In some embodiments, the sharable network resources further include at least a physical network infrastructure component. In some embodiments, the physical network infrastructure component includes at least one of a cell tower or spectrum.

In some embodiments, the request for the one or more network resources indicates a selected level of sharing associated with each of the one or more network resources. In some embodiments, the selected level of sharing associated with a particular network resource of the one or more network resources includes at least one of a dedicated use of the particular network resource, a restricted shared use of the particular network resource, or an unrestricted shared use of the particular network resource.

In some embodiments, determining the sharing availability of the one or more network resources comprises communicating with at least one of a network core of the communications network, a business support service, or an operation support service.

In some embodiments, determining the sharing availability of the one or more network resources comprises determining at least one of an available network capacity, available spectrum, available network function, available network slice, predicted load on a network of primary customer solution, or predicted load on a network of additional customer solution.

In some embodiments, causing establishment of the one or more network resources comprises causing instantiation, activation, or appropriation of the one or more network resources.

In some embodiments, network resource sharing facilitator implements, at least in part, a method for sharing resources of a communications network. The method includes presenting options and statuses of sharable network resources of a communications network, obtaining a request for one or more network resources of the communications network, and determining sharing availability of the one or more network resources. The method also includes updating further presenting the options and statuses of sharable network resources based, at least in part, on the determined sharing availability, and causing establishment of the one or more network resources.

In some embodiments, the sharable network resources include at least one of a virtualized network infrastructure component or physical network infrastructure component.

In some embodiments, the request for the one or more network resources indicates an acceptable level of sharing associated with each of the one or more network resources. In some embodiments, the acceptable level of sharing associated with a particular network resource of the one or more network resources includes at least one of a dedicated use of the particular network resource, a restricted shared use of the particular network resource, or an unrestricted shared use of the particular network resource.

In some embodiments, determining the sharing availability of the one or more network resources comprises determining at least one of an available network capacity, available spectrum, available network function, available network slice, predicted load on a network of primary customer solution, or predicted load on a network of additional customer solution.

In some embodiments, the network resource sharing facilitator includes a non-transitory computer-readable medium. The computer-readable medium stores contents that, when executed by the one or more processors, cause the one or more processors to perform actions. The actions include presenting options and statuses of sharable network resources of a communications network, obtaining a request for one or more network resources of the communications network, and determining sharing availability of the one or more network resources. The actions also include updating further presenting the options and statuses of sharable network resources based, at least in part, on the determined sharing availability, and causing establishment of the one or more network resources.

In some embodiments, the communications network includes a 5G cellular network. In some embodiments, the sharable network resources include at least a virtualized component of 5G Core.

In some embodiments, determining the sharing availability of the one or more network resources comprises communicating with at least one of a network core of the communications network, a business support service, or an operation support service.

In some embodiments, causing establishment of the one or more network resources comprises causing instantiation, activation, or appropriation of the one or more network resources.

The network resource sharing facilitator allows the MNO to provide any single or combination of network components as service(s) to customers. The MNO's products and services are therefore not limited to the typical wireless portfolios offered by traditional wireless communications service providers. With the technologies disclosed herein, customers of the MNO can instantiate their own, dedicated network component (e.g., UPF). MVNOs can have greater flexibility and not be forced to work with a mobile virtual network enabler (MVNE) in order to have access to a full suite of services necessary to operate their business. Furthermore, the MNO's virtualized infrastructure can be shared, lowering the potential cost to enterprise customers. Sharing can also be dynamic, so an enterprise customer can elect to share a component only for a specified duration or under certain conditions (i.e., enterprise customer's private radio access network (RAN) that also serves MNO subscribers in a public venue). Traditional MNOs lack the virtualized architecture or infrastructure to achieve this: their network architectures cannot broadly (e.g., on a nationwide level) expose specific, individual network infrastructure components.

Figure 1:
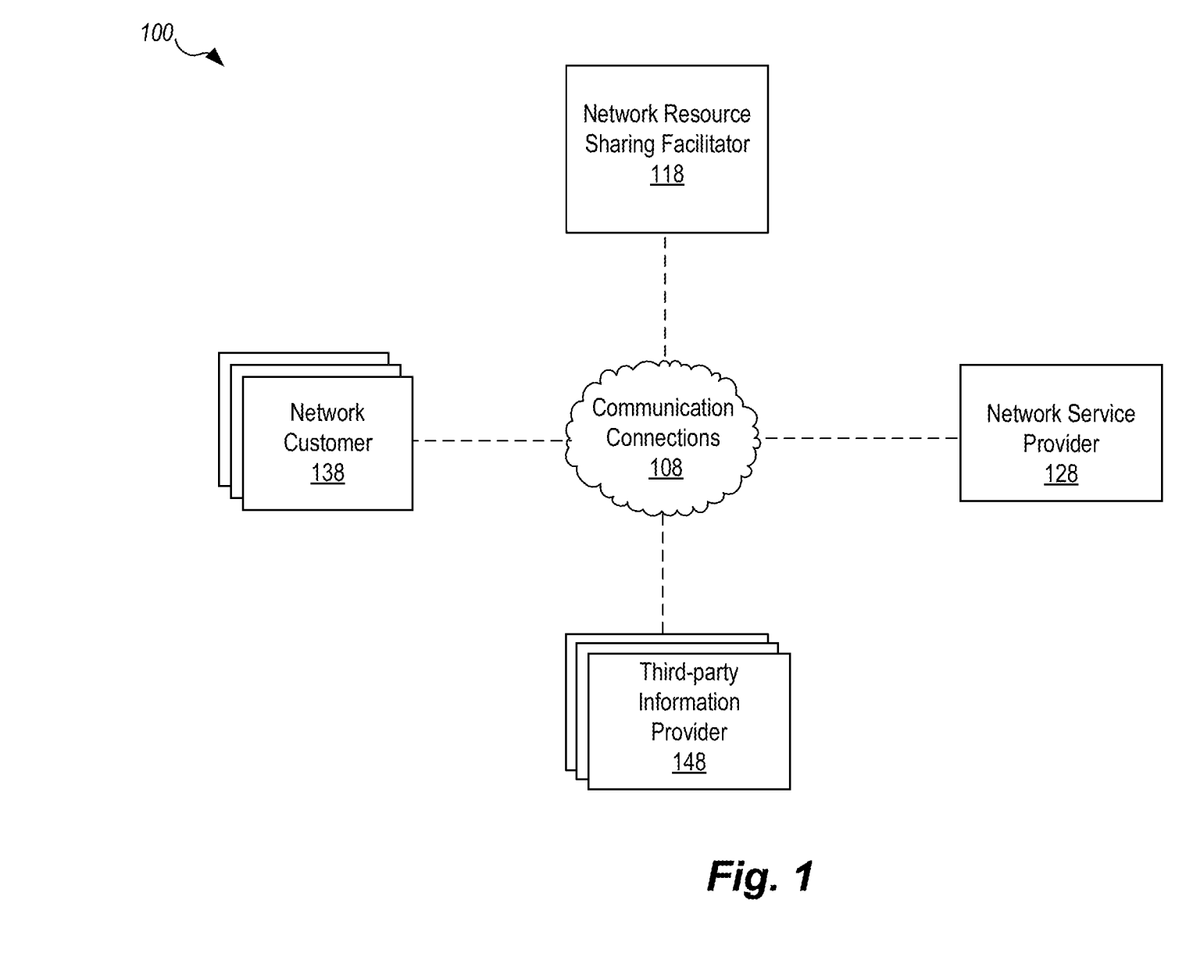
FIG. 1 is a block diagram illustrating an example networked environment for facilitating network resource sharing in accordance with some embodiments of the techniques described herein.

FIG. 1 is a block diagram illustrating an example networked environment 100 for facilitating network resource sharing in accordance with some embodiments of the techniques described herein. The networked environment 100 includes a network resource sharing facilitator 118, a network service provider 128, one or more network customers 138, and one or more third-party information providers 148, that are communicatively connected to one another via at least some part of communication connections 108. One or more wireless communications networks (e.g., a 5G mobile network) are at least partially subject to control the network service provider 128. In various embodiments, the network service provider 128 includes network Core functions associated with a MNO.

In the depicted networked environment 100, the communication connections 108 may comprise one or more computer networks, one or more wired or wireless networks, satellite transmission media, one or more cellular networks, or some combination thereof. The communication connections 108 may include a publicly accessible network of linked networks, possibly operated by various distinct parties, such as the Internet. The communication connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the communication connections 108 may include various types of wired and/or wireless networks in various situations, including satellite transmission. In addition, the communication connections 108 may include one or more communication interfaces to individual entities in the networked environment 100, various other mobile devices, computing devices and media devices, including but not limited to, radio frequency (RF) transceivers, cellular communication interfaces and antennas (e.g., CBRS nodes or other cellular nodes), USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, examples of a network customer 138 include a device or system of a subscriber to service(s) provided by the network service provider 128. The device or system includes, but are not limited to, one or a combination of the following: a "computer," "mobile device," "gaming console," "tablet computer," "smart phone," "handheld computer," and/or "workstation," etc. The network customer 138 may include any suitable computing device or electronic equipment that, e.g., can communicate with the network resource sharing facilitator 118 and the network service provider 128.

In various embodiments, the network resource sharing facilitator 118 can include one or more computing devices for performing the resource sharing facilitating functions described herein. In some embodiments, the network resource sharing facilitator 118 is part of the network service provider 128 or is partially implemented within the network service provider 128 (e.g., partially implemented in one or more elements in the Core of a communications network).

In various embodiments, the network service provider 128 and individual third-party information providers 148 can be implemented in software and/or hardware form on one or more computing devices including a "computer," "mobile device," "tablet computer," "smart phone," "handheld computer," "server," and/or "workstation," etc. The third-party information provider(s) 148 can provide business, operation, marketing, pricing, or other information related to the services provided by the network service provider 128.

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Figure 2:
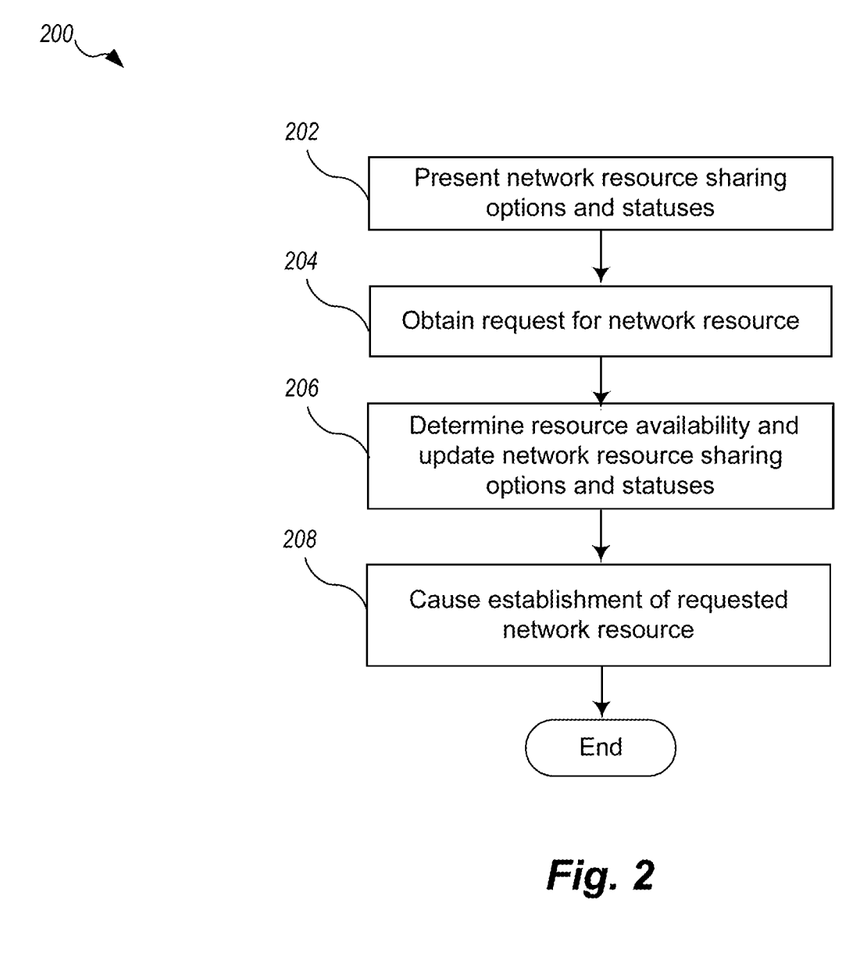
FIG. 2 is a flow diagram depicting an example process for facilitating network resource sharing in accordance with some embodiments of the techniques described herein.

FIG. 2 is a flow diagram depicting an example process 200 for facilitating network resource sharing in accordance with some embodiments of the techniques described herein. In various embodiments, at least some part of the process 200 is performed in real time; and at least some part of the process 200 can be implemented by the network resource sharing facilitator 118 of FIG. 1.

The process 200 starts at block 202, which includes presenting options and statuses of sharable network resources of a communications network, e.g., a 5G cellular network controlled, managed, or otherwise associated with the network service provider 128. Illustratively, the network resource sharing facilitator 118 can cause presentation of a catalog of available shareable macro network components or micro service functions, a catalog of available dedicated (e.g., for private use) network components, combinations of the same or the like, to one or more network customers 138. The network resource sharing facilitator 118 can also cause presentation of actual, estimated, or predicted status of availability associated with the shareable or dedicated components.

In some embodiments, the sharable network resources include at least a virtualized network infrastructure component, such as virtualized NEF, NRF, UPF, AMF, AF, or other virtualized component of 5G Core. In some embodiments, the sharable network resources further include at least a physical network infrastructure component, such as a cell tower, spectrum, or other physical element of RAN.

At block 204, the process 200 includes obtaining a request for one or more network resources of the communications network. Illustratively, the request is received from a network customer 138 in response to the presented options and statuses. In some embodiments, the request includes one or more combinations of selected resources each associated with certain sharing or dedicated use criteria.

In some embodiments, the request indicates a selected, acceptable, or other threshold level of sharing associated with each of the one or more network resources. Illustratively, the level of sharing associated with a particular network resource of the one or more network resources includes at least one of a dedicated use of the particular network resource, a restricted shared use of the particular network resource, or an unrestricted shared use of the particular network resource.

At block 206, the process 200 includes determining sharing availability of the one or more network resources, and updating further presenting the options and statuses of sharable network resources based on the determined sharing availability.

In some embodiments, determining the sharing availability of the one or more network resources includes communicating with at least one of a network core of the communications network, a business support service, or an operation support service. In some embodiments, determining the sharing availability of the one or more network resources includes determining at least one of an available network capacity, available spectrum, available network function, available network slice, predicted load on a network of primary customer solution, or predicted load on a network of additional customer solution associated with the one or more network resources.

In some embodiments, the determining of sharing availability is based on the criteria, thresholds, or other input from the network customer 138 indicated in the request, and applicable combinations of resources may be evaluated in concert with one another rather than individually. In some embodiments, the determining of sharing availability is performed in real time. Based on the determined sharing availability of the one or more network resources, the options and statuses of sharable network resources are updated and re-presented to show the most up-to-date information.

At block 208, the process 200 includes causing establishment of the one or more network resources. Illustratively, if it is determined that the requested one or more resources are available, e.g., satisfying applicable criteria, thresholds, or other input from the network customer 138, the network resource sharing facilitator 118 can cause instantiation, activation, or appropriation of the one or more network resources. Illustratively, the network resource sharing facilitator 118 can include an activation engine which may request or instantiate virtualized resource(s) in the core of the communications network of the network service provider 128. In some embodiments, because network infrastructure (e.g., 5G Core) is virtualized, the activation engine can also cause physical resource(s) such as physical RAN element(s) to be appropriated in an instantaneous and scalable manner.

Those skilled in the art will appreciate that the various operations depicted via FIG. 2, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 3:
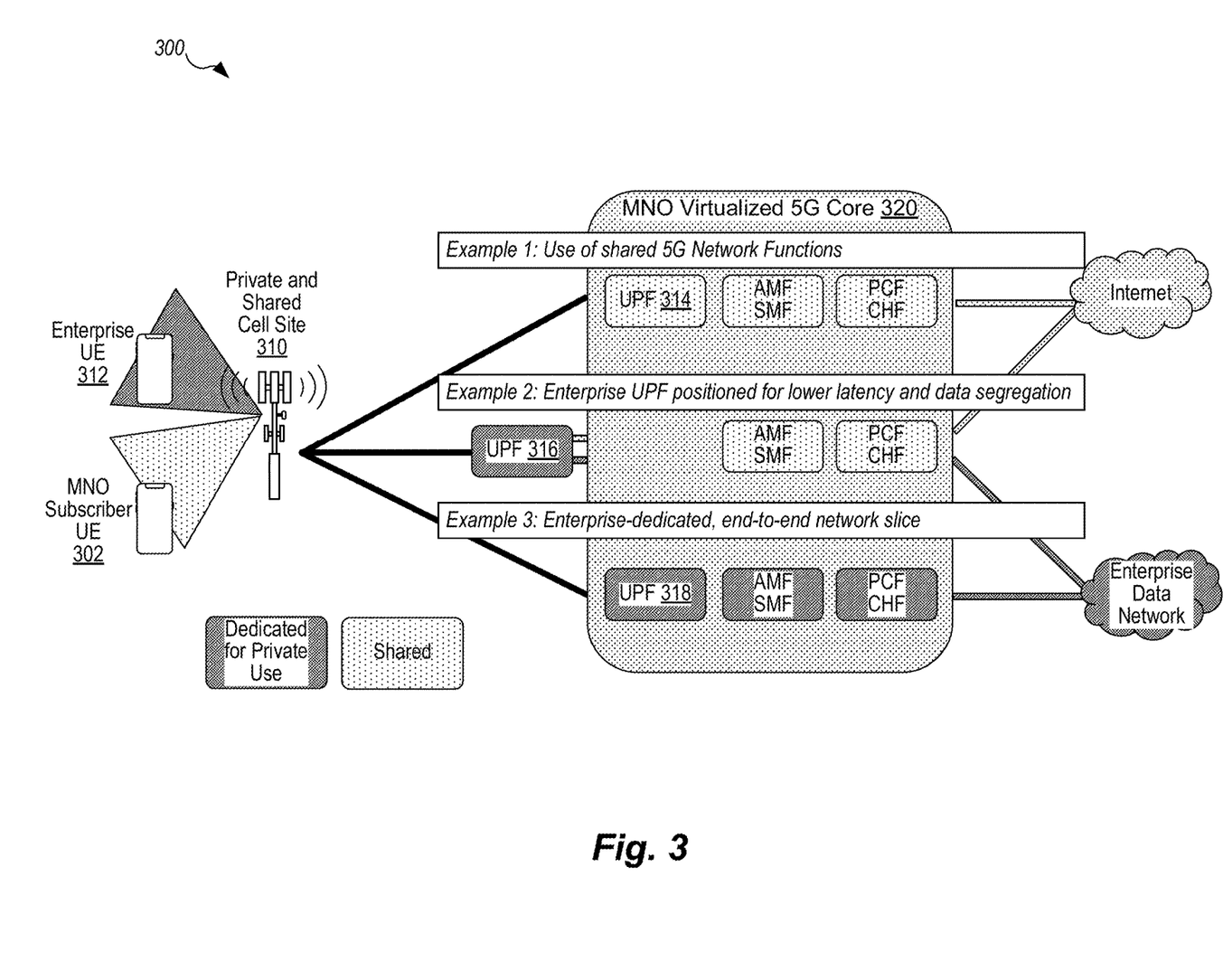
FIG. 3 is a contextual diagram depicting example implementations that result from network resource sharing in accordance with some embodiments of the techniques described herein.

FIG. 3 is a contextual diagram depicting example implementations 300 that result from network resource sharing in accordance with some embodiments of the techniques described herein. Illustratively, at least some part of the example implementations 300 is achieved using the process 200 of FIG. 2.

As shown, a cell site 310 is configured to support both private (e.g., dedicated to an enterprise) and shared use. Both enterprise UE 312 and MNO subscriber UE 302 can be communicatively connected via the cell site 310. At least three examples of network resource implementations are shown in this context.

In accordance with example 1, the MNO's virtualized 5G Core 320 implements network functions including UPF 314, AMF, SMF, PCF, CHF, or the like, which can be shared with the enterprise or other network customers so they do not need to establish their own network functions. The implementation cost for the enterprise is lowest.

In accordance with example 2, a dedicated UPF 316 is established for the enterprise to achieve lower latency and data segregation. The dedicated UPF 316 can be independently established or can still be hosted by the MNO as a virtual instance. The enterprise still share use of other network functions in the MNO's virtualized 5G Core 320, such as AMF, SMF, PCF, and CHF, so that the overall implementation cost is low for the enterprise.

In accordance with example 3, a fully-dedicated package of network functions including UDF 318 and others such as AMF, SMF, PCF, and CHF is established for the enterprise to achieve a highly-dedicated high-performance network. Illustratively, this can be implemented via an enterprise-dedicated, end-to-end network slice. The MNO can host some or all of the dedicated network functions on behalf of the enterprise. While the implementation cost for the enterprise is higher, this implementation is most customized and achieves best performance.

Figure 4:
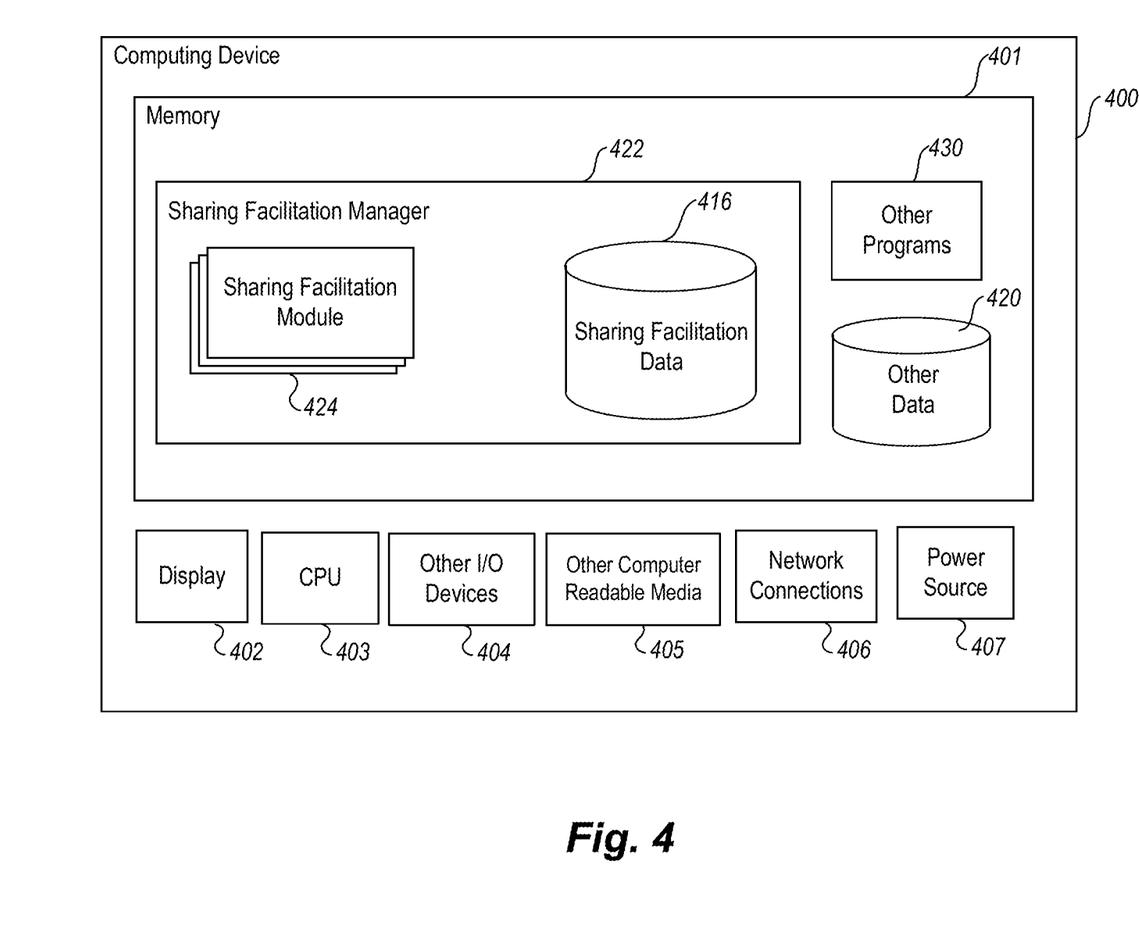
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a network resource sharing facilitator 118, a network service provider 128, a third-party information provider 138, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the sharing facilitation manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units ("CPU") or other processors 403, Input/Output ("I/O") devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The sharing facilitation manager 422 is shown residing in memory 401. In other embodiments, some portion of the contents and some, or all, of the components of the sharing facilitation manager 422 may be stored on and/or transmitted over the other computer-readable media 405. The components of the computing device 400 and sharing facilitation manager 422 can execute on one or more processors 403 and implement applicable functions described herein. In some embodiments, the sharing facilitation manager 422 may operate as, be part of, or work in conjunction and/or cooperation with other software applications stored in memory 401 or on various other computing devices. In some embodiments, the sharing facilitation manager 422 also facilitates communication with peripheral devices via the I/O devices 404, or with another device or system via the network connections 406.

The one or more sharing facilitation modules 424 is configured to perform actions related, directly or indirectly, to facilitating and managing wireless network resource as described herein. In some embodiments, the sharing facilitation module(s) 424 stores, retrieves, or otherwise accesses at least some resource sharing facilitation-related data on some portion of the sharing facilitation data storage 416 or other data storage internal or external to the computing device 400. In various embodiments, at least some of the sharing facilitation modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and sharing facilitation manager 422 include API(s) that provides programmatic access to add, remove, or change one or more functions of the computing device 400. In some embodiments, components/modules of the computing device 400 and sharing facilitation manager 422 are implemented using standard programming techniques. For example, the sharing facilitation manager 222 may be implemented as an executable running on the processor(s) 403, along with one or more static or dynamic libraries. In other embodiments, the computing device 400 and sharing facilitation manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VB Script, and the like), or declarative (e.g., SQL, Prolog, and the like).

In a software or firmware implementation, instructions stored in a memory configure, when executed, one or more processors of the computing device 400 to perform the functions of the sharing facilitation manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a sharing facilitation manager 422 implementation. Also, other functions could be implemented and/or performed by each component/module, and in different orders, and by different components/modules, yet still achieve the functions of the computing device 400 and sharing facilitation manager 422.

In addition, programming interfaces to the data stored as part of the computing device 400 and sharing facilitation manager 422, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The sharing facilitation data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the sharing facilitation manager 422.

Furthermore, in some embodiments, some or all of the components of the computing device 400 and sharing facilitation manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for sharing resources of a communications network, comprising:
   one or more processors; and
   memory storing contents that, when executed by the one or more processors, cause the system to perform actions comprising:
   presenting options and statuses of sharable network resources of a communications network;
   obtaining a request for one or more network resources of the communications network, wherein the request for the one or more network resources indicates a selected level of sharing associated with each of the one or more network resources;
   determining sharing availability of the one or more network resources;
   updating further presenting the options and statuses of sharable network resources based, at least in part, on the determined sharing availability; and
   causing establishment of the one or more network resources.

2. The system of claim 1, wherein the sharable network resources include at least a virtualized network infrastructure component.

3. The system of claim 2, wherein the virtualized network infrastructure component includes at least one of a virtualized Network Exposure Function (NEF), virtualized Network Function Repository Function (NRF), virtualized User Plane Function (UPF), virtualized Access & Mobility Management Function (AMF), or virtualized Application Function (AF).

4. The system of claim 2, wherein the sharable network resources further include at least a physical network infrastructure component.

5. The system of claim 4, wherein the physical network infrastructure component includes at least one of a cell tower or spectrum.

6. The system of claim 1, wherein the selected level of sharing associated with a particular network resource of the one or more network resources includes at least one of a dedicated use of the particular network resource, a restricted shared use of the particular network resource, or an unrestricted shared use of the particular network resource.

7. The system of claim 1, wherein determining the sharing availability of the one or more network resources comprises communicating with at least one of a network core of the communications network, a business support service, or an operation support service.

8. The system of claim 1, wherein determining the sharing availability of the one or more network resources comprises determining at least one of an available network capacity, available spectrum, available network function, available network slice, predicted load on a network of primary customer solution, or predicted load on a network of additional customer solution.

9. The system of claim 1, wherein causing establishment of the one or more network resources comprises causing instantiation, activation, or appropriation of the one or more network resources.

10. A method for sharing resources of a communications network, comprising:
    presenting options and statuses of sharable network resources of a communications network;
    obtaining a request for one or more network resources of the communications network, wherein the request for the one or more network resources indicates an acceptable level of sharing associated with each of the one or more network resources;
    determining sharing availability of the one or more network resources;
    updating further presenting the options and statuses of sharable network resources based, at least in part, on the determined sharing availability; and
    causing establishment of the one or more network resources.

11. The method of claim 10, wherein the sharable network resources include at least one of a virtualized network infrastructure component or physical network infrastructure component.

12. The method of claim 10, wherein the acceptable level of sharing associated with a particular network resource of the one or more network resources includes at least one of a dedicated use of the particular network resource, a restricted shared use of the particular network resource, or an unrestricted shared use of the particular network resource.

13. The method of claim 10, wherein determining the sharing availability of the one or more network resources comprises determining at least one of an available network capacity, available spectrum, available network function, available network slice, predicted load on a network of primary customer solution, or predicted load on a network of additional customer solution.

14. A non-transitory computer-readable medium storing contents that, when executed by the one or more processors, cause the one or more processors to perform actions comprising:
    presenting options and statuses of sharable network resources of a communications network;
    obtaining a request for one or more network resources of the communications network, wherein the request for the one or more network resources indicates a selected level of sharing associated with each of the one or more network resources;
    determining sharing availability of the one or more network resources;
    updating further presenting the options and statuses of sharable network resources based, at least in part, on the determined sharing availability; and
    causing establishment of the one or more network resources.

15. The computer-readable medium of claim 14, wherein the communications network includes a Fifth Generation (5G) cellular network.

16. The computer-readable medium of claim 15, wherein the sharable network resources include at least a virtualized component of 5G Core.

17. The computer-readable medium of claim 14, wherein determining the sharing availability of the one or more network resources comprises communicating with at least one of a network core of the communications network, a business support service, or an operation support service.

18. The computer-readable medium of claim 14, wherein causing establishment of the one or more network resources comprises causing instantiation, activation, or appropriation of the one or more network resources.

* * * * *